United States Patent
Rana (10) Patent No.: US 10,127,729 B2
(45) Date of Patent: Nov. 13, 2018

(54) SYSTEM AND METHOD FOR FACILITATING VIRTUAL-SPACE-BASED PRESENTATION AND USER INTERACTION

(71) Applicant: CIGNA INTELLECTUAL PROPERTY, INC., Wilmington, DE (US)

(72) Inventor: Ajaz Rana, Princeton, NJ (US)

(73) Assignee: CIGNA INTELLECTUAL PROPERTY, INC., Wilmington, DE (US)

(*) Notice: Subject to any disclaimer, the term of this patent is extended or adjusted under 35 U.S.C. 154(b) by 0 days.

(21) Appl. No.: 15/481,412

(22) Filed: Apr. 6, 2017

(65) Prior Publication Data
US 2018/0293797 A1    Oct. 11, 2018

(51) Int. Cl.
*G06T 19/00*      (2011.01)
*G06F 3/0481*     (2013.01)

(52) U.S. Cl.
CPC ........ *G06T 19/006* (2013.01); *G06F 3/04815* (2013.01)

(58) Field of Classification Search
CPC .......... G06F 19/26; G06F 19/28; G06F 19/24; G06F 3/012; G06T 2210/41; G06T 17/00; G06T 11/206; G16H 50/70; G16H 10/60; G16H 15/00; G16H 50/30; G16H 40/20; G16H 50/50; G16H 50/20; G06Q 10/06;
(Continued)

(56) References Cited

U.S. PATENT DOCUMENTS

| 6,947,905 B1* | 9/2005 | Starr ............... G06Q 10/06 705/37 |
| 7,548,903 B2 | 6/2009 | Chiang et al. |
| 2005/0055289 A1 | 3/2005 | Mehldahl |

(Continued)

FOREIGN PATENT DOCUMENTS

JP     2000-207450 A     7/2000

OTHER PUBLICATIONS

International Search Report PCT/US2018/019379 dated Jun. 21, 2018.
(Continued)

*Primary Examiner* — Haixia Du
(74) *Attorney, Agent, or Firm* — Pillsbury Winthrop Shaw Pittman LLP (57) ABSTRACT

In certain embodiments, service-related information related to an individual may be obtained. The service-related information may indicate real-world services, times of performance of the real-world services, quantities related to the real-world services, or other information. A three-dimensional virtual space may be provided such that at least one dimension of the three-dimensional virtual space corresponds to time of service performance. Based on the service-related information, three-dimensional objects associated with the real-world services may be provided to be presented in the three-dimensional virtual space such that (i) at least one dimension of each of the three-dimensional objects corresponds to a monetary amount related to at least one of the real-world services and (ii) the three-dimensional objects are presented in the three-dimensional virtual space in accordance with the respective times of performance of the associated services.

22 Claims, 6 Drawing Sheets

(58) Field of Classification Search
CPC .... G06Q 40/00; G06Q 40/06; G06Q 10/0631;
G06Q 30/02; G06Q 30/04; G06Q 40/08
See application file for complete search history.

(56) References Cited

U.S. PATENT DOCUMENTS

| | | |
|---|---|---|
| 2011/0119077 A1 | 5/2011 | Gice et al. |
| 2014/0258938 A1 | 9/2014 | Christmas et al. |
| 2016/0004979 A1* | 1/2016 | Getchius .............. G06N 99/005 706/12 |

OTHER PUBLICATIONS

Written Opinion of the International Searching Authority PCT/US2018/019379 dated Jun. 21, 2018.

* cited by examiner

SYSTEM AND METHOD FOR FACILITATING VIRTUAL-SPACE-BASED PRESENTATION AND USER INTERACTION

FIELD OF THE INVENTION

The invention relates to virtual-space-based presentation and/or user interaction, including, for example, virtual-space-based presentation and user interaction with virtual space objects representing service-related information and/or health-related information.

BACKGROUND OF THE INVENTION

As the number of Internet and computer users continues to grow, the insurance and other service industries are moving away from paper statements and other documents to electronic documents. As an example, explanation of benefits (EOB)—typically, a written statement to a beneficiary, from a third party payer/insurer (after a claim has been reported), indicating the benefits and charges covered or not covered by the beneficiary's insurance plan. The statement describes benefits, deductibles, co-payment responsibilities, and reasons for non-coverage of claims. Such statements are now presented to beneficiary users as electronic documents in a web-based or mobile-based form. Nevertheless, individuals viewing the statements (e.g., in the web-based or mobile-based form) often have trouble understanding these "explanation of benefits" (as well as other information related to other services), thereby creating a poor user experience for such individuals. These and other drawbacks exist.

SUMMARY OF THE INVENTION

Aspects of the invention relate to methods, apparatuses, and/or systems for facilitating virtual-space-based presentation and user interaction with virtual space objects representing service-related information and/or health-related information.

In some embodiments, service-related information related to an individual may be obtained. The service-related information may indicate real-world services, times of performance of the real-world services, quantities related to the real-world services, or other information. A three-dimensional virtual space may be provided such that at least one dimension of the three-dimensional virtual space corresponds to time of service performance. Based on the service-related information, three-dimensional objects associated with the real-world services may be provided to be presented in the three-dimensional virtual space such that (i) at least one dimension of each of the three-dimensional objects corresponds to a monetary amount related to at least one of the real-world services and (ii) the three-dimensional objects are presented in the three-dimensional virtual space in accordance with the respective times of performance of the associated services.

In some embodiments, service-related information related to an individual may be obtained. The service-related information may indicate one or more real-world services performed or to be performed, costs related to the real-world services, or other information. Three-dimensional objects associated with the real-world services may be provided (based on the service-related information) to be presented in a three-dimensional virtual space. A first user input may be obtained, where the first user input indicates a movement of a first object of the three-dimensional objects to a first region of the three-dimensional virtual space. A second user input may be obtained, where the second user input indicates a movement of a second object of the three-dimensional objects to the first region of the three-dimensional virtual space. A container object may be provided proximate the first region, the first object, and the second object in the three-dimensional virtual space based on the movement of the first object and the second object. The container object may be associated with one or more costs derived from one or more costs associated with the first object and one or more costs associated with the second object. One or more labels representing the derived costs may be provided (based on the movement of the first object and the second object) to be presented proximate the container object.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
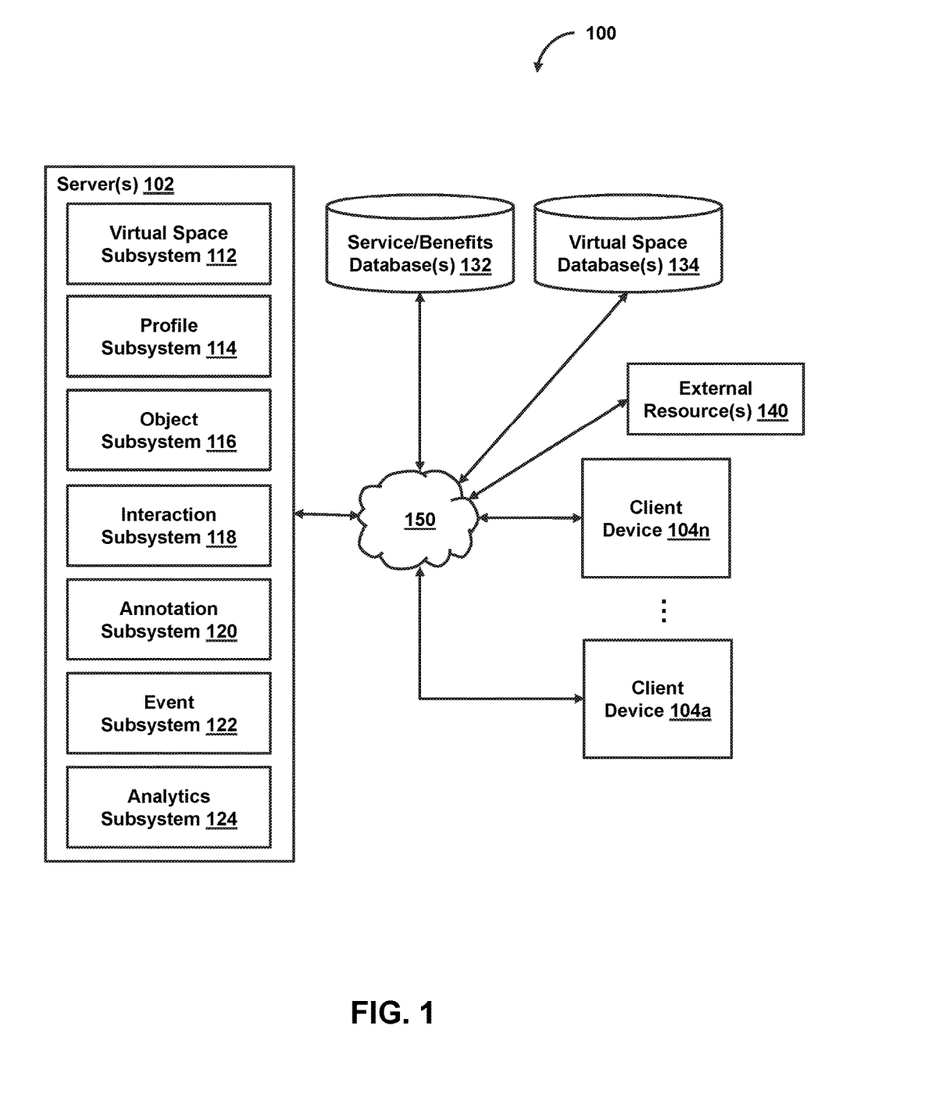
FIG. 1 shows a system for facilitating virtual-space-based presentation and user interaction, in accordance with one or more embodiments.

FIG. 1 shows a system 100 for facilitating data streaming services, data visualization services, or other data access services, in accordance with one or more embodiments. As shown in FIG. 1, system 100 may include server(s) 102, client device 104 (or client devices 104a-104n), or other components. Server 102 may include virtual space subsystem 112, profile subsystem 114, object subsystem 116, interaction subsystem 118, annotation subsystem 120, event subsystem 122, analytics subsystem 124, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. As shown, system 100 may include access to sources of information, such as services/benefits database(s) 132, virtual space database(s) 134, or other sources. As an example, external resource(s) 140 may include sources of information, hosts and/or providers of virtual spaces outside of system 100, external entities participating with system 100, and/or other resources. In some embodiments, some or all of the functionality attributed herein to external resource(s) 140 may be provided by resources included in system 100.

As discussed, even with the advent of the Internet and the growing number of users, statements or other documents (e.g., EOBs and other documents) are typically provided to users in a traditional manner (albeit, offered in a web-based or mobile-based form). With seemingly complex documents (e.g., from the perspective of an inexperience lay person), individuals often have trouble understanding the information in these documents, for example, due to the difficulty of the jargon, the large amount of categories, numbers, and other items, or inexperience with reading such documents, thereby creating a poor user experience for such individuals. Additionally, or alternatively, such documents often fail to show or indicate causal relationships between services, activities, and their outcomes. As an example, EOBs generally do not indicate the relationship of an individual's current or prior health statuses (e.g., blood pressure, heart rate, weight, body mass index, fat mass percentage, sleep, or other statuses) with services performed (e.g., doctor's appointments, surgery, prescriptions, physical therapy, or other services).

To address these and/or other issues, in some embodiments, system 100 may provide one or more approaches to information aggregation, visualization, and interaction. In some embodiments, system 100 may provide a virtual space (e.g., a three-dimensional virtual space) (i) via which virtual-space-object representations of service-related information, health-related information, or other information are provided for presentation to one or more users, (ii) via which users can interact with virtual space objects and the virtual space in more intuitive manners to obtain, aggregate, or organize such information, (iii) via which users can visualize the causal relationships between services, activities, and their outcomes, or (iv) via which other features are provided.

In some embodiments, virtual space subsystem 112 may provide a virtual space. In some embodiments, virtual space subsystem 112 may execute an instance of the virtual space. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from virtual space subsystem 112. Expressions of the instance executed on the clients may include space logic that effectively provides for execution of a limited version of the instance on a client that is synchronized and/or verified with state information received from virtual space subsystem 112. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may include a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the virtual space subsystem 112 may be synchronous, asynchronous, and/or semi-synchronous. The instance of the virtual space may implemented as part of an augmented reality system (e.g., which overlays views of the virtual space over views of a real-world environment), a virtual reality system, a mixed reality system (e.g., combining one or more features of augmented reality and virtual reality), or other system (e.g., implementing the instance of the virtual space as part of a game environment).

The above description of the views of the virtual space determined from the instance executed by virtual space subsystem 112 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic graphic of a hospital with a textual description of the doctors, caretakers, and patients. Other representations of individual places within the virtual space are contemplated.

Within the instance of the virtual space executed by virtual space subsystem 112, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client devices 104. Communications may be routed to and from the appropriate users through server(s) 102 (e.g., through virtual space subsystem 112).

In some embodiments, virtual space subsystem 112 may provide a virtual space via which representations of service-related information, health-related information, or other information are provided for presentation to one or more users. In some embodiments, the virtual space may include a two-dimensional virtual space, a three-dimensional virtual space, or other virtual space. In some embodiments, at least one dimension of the virtual space may correspond to time (e.g., dates, points in time during respective days, etc., at which one or more services were or are to be performed, one or more measurements were or are to be taken, one or more activities occurred or predicted to occur, etc.). Additionally, or alternatively, at least one dimension of the virtual space may corresponds to quantity (e.g., quantities related to one or more services, quantities related to physiology of one or more individuals, quantities related to activity of one or more entities, or other quantities).

Figure 2A:
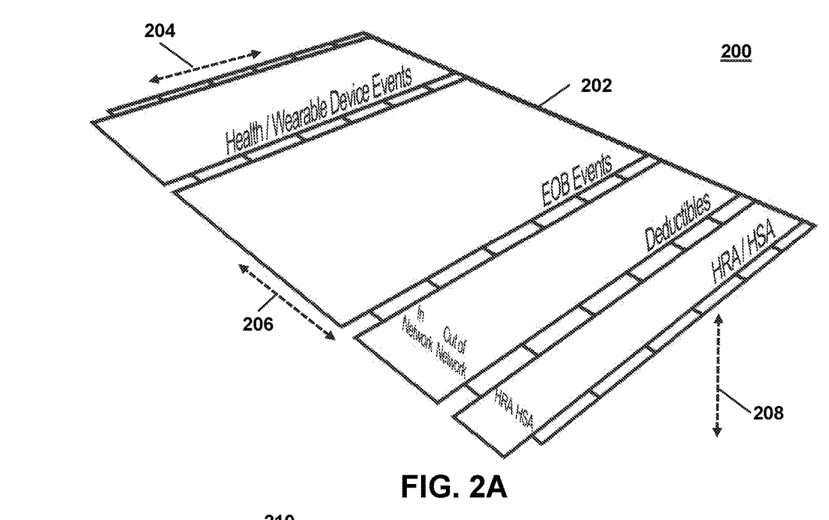
FIGS. 2A-2F illustrate views of a three-dimensional virtual space via which service-related information and other information are presented, in accordance with one or more embodiments.

As an example, with respect to FIG. 2A, a user may utilize user interface 200 to access and interact with a three-dimensional virtual space 202 via which representations of service-related information, health-related information, or other information are provided. In one scenario, virtual space 202 includes three dimensions 204, 206, and 208. As an example, dimension 204 may correspond to time (e.g., years, months, days within a month, days within a week, hours, etc.). As another example, dimension 206 may correspond to event (e.g., health/wearable device events, explanation of benefits (EOB) events, insurance deductible events, health reimbursement arrangement (HRA) events, health savings account events, etc.). As yet another example, dimension 208 may correspond to quantity (e.g., quantities related to one or more services, quantities related to physiology of one or more individuals, quantities related to activity of one or more entities). These different dimensions and their representations thereof (and/or the different dimensions of virtual space objects and their representations thereof as described herein in some embodiments) may enable users to more easily grasp greater amounts of information, as compared to traditional web-based or mobile-based approaches provided via typical electronic document computer systems. It should be noted that, in other scenarios, the dimensions of virtual space 202 may correspond to one or more other attributes or other information and/or two or more regions of virtual space 202 may have dimensions different from one another. As shown in FIG. 2A, two of the three dimensions of virtual space 202 may include a time and events plane. Information that may be represented in virtual space 202 may include EOB information, insurance deductible information, HRA information, HSA information, health/wearable device information, or other information (e.g., other service-related information, other health-related information, etc.).

Figure 2B:
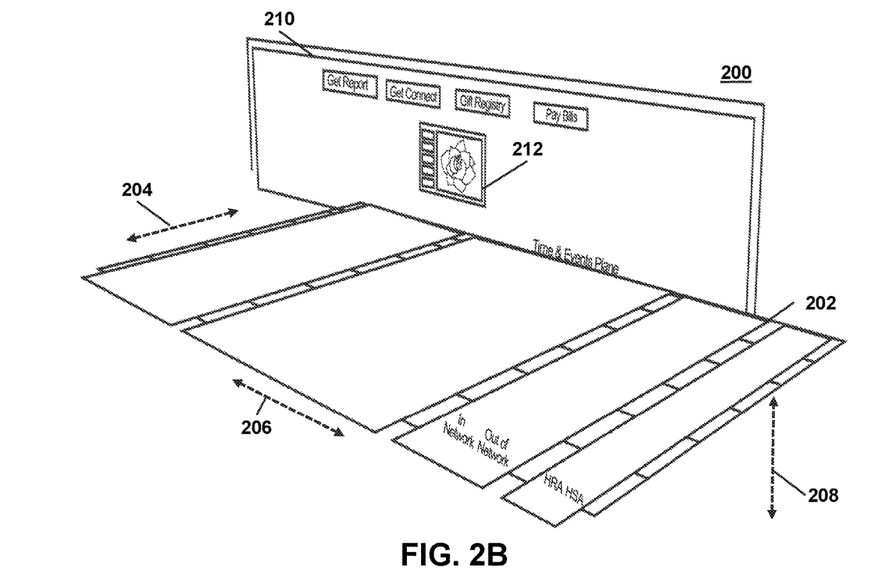
Figure 2C:
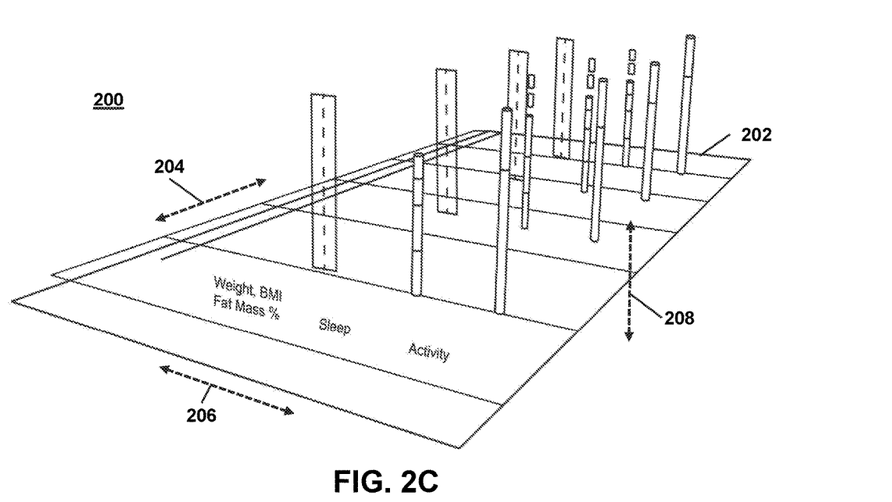

As a further example, with respect to FIG. 2B, virtual space 202 may include a relevance slider pane 210 (or slider plane 210) that moves along at least one dimension of virtual space 202, such as a dimension corresponding to time or other dimension. As shown in FIG. 2B, slider pane 210 includes one or more actionable areas (e.g., buttons or other actionable areas) via which a user initiate one or more actions (e.g., Get Report, Get Connected, Assess Gift Registry, Pay Bills, etc.). The actionable areas or other items (e.g., media items) may be presented on the slider pane 210 based on the context of the user interactions with virtual space 202. The slider pane 210 may, for instance, be dynamically updated to reflect the current context of the user interactions. In one use case, the actionable area associated with "Pay Bills" may be replaced with another actionable area associated with a different action if, for instance, the user is currently interacting with a portion of virtual space 202 that is not related to paid services (e.g., if the user is currently viewing an region of virtual space 202 with objects representing health data).

In another use case, as slider pane 210 moves across the time dimension, media or other items related to a point in time (to which the current position of slider pane 210 corresponds with respect to the time dimension) may be obtained and presented on slider pane 210 (or in another area of virtual space 202). For example, if the current position of slider pane 210 is at a "May 2016" point in time of the time dimension, a video, image, or other media item may be obtained for presentation on slide pane 210 based on a determination that the video, image, or other media item is relevant to "May 2016" (e.g., based on an explicit association between the media item and May 2016 time in a database or other determination that the media item is relevant). Other additional or alternatively factors on which the obtainment and presentation of the media item is based may include a determination that the media item is relevant to the user (or an entity to which the presented information is related) or other determination. In this way, for example, a user may access media or other items in a user-friendly manner via movement of slide pane 210 across one or more dimensions of virtual space 202.

In another use case, with respect to FIG. 2B, objects associated with services, physiology parameters, activities, or other items may be placed in virtual space 202 in accordance with their respective times of performance, measurement, or occurrence (see FIGS. 2C-2F). For example, when the current position of slider pane 210 is at a "May 2016" point in time of the time dimension, a media item (or other item) may be obtained for presentation on slider pane 210 based on a determination that the media item is relevant to a service, physiology parameter, activity, or other item with which an object (placed at the May 2016 time) is associated (e.g., based on an explicit association between the media item and the object in a database or other determination that the media item is relevant). As a further example, one of the objects placed in virtual space 202 at the May 2016 time may be a three-dimensional object associated with a laser eye surgery to correct a patient's vision. When the current position of slider pane 210 is at the May 2016, a video of the laser-eye surgery may be obtained and presented on slider pane 210 (or other area of virtual space 202) based on a determination that the laser-eye surgery is relevant to the surgery event. Other additional or alternatively factors on which the obtainment and presentation of the media item is based may include a determination that the media item is relevant to the user (or an entity to which the presented information is related), a determination that the media item is relevant to the May 2016 time, or other determination. In this way, for example, a user may access media or other items relevant to object-represented information (e.g., services, physiology parameters, activities, or other items) in a user-friendly manner via movement of slide pane 210 across one or more dimensions of virtual space 202.

In some embodiments, profile subsystem 114 may obtain service-related information, health-related information, or other information related to an individual (e.g., patient or other individual), group (e.g., family or other group), or other entity. Profile subsystem 114 may, for example, obtain the information from service/benefits database 132 or other database. Additionally, or alternatively, profile subsystem 114 may obtain the information via event subsystem 122, which may stream real-time information (or other information) from cloud services, internet of things (IOT) devices/systems (e.g., wearables or other sensor/monitoring devices), or other sources. Object subsystem 116 may provide, based on the obtained information, one or more objects in a virtual space (e.g., a two-dimensional virtual space, a three-dimensional virtual space, etc.).

As an example, the objects may include one or more two-dimensional objects, three-dimensional objects, or other objects. The objects may be associated with one or more (i) services (e.g., doctor or clinical visits, lab tests, pharmacy services, other medical-related services, or other services), (ii) physiology parameters (e.g., blood pressure, heart rate, weight, body mass index, fat mass, or other parameters), (iii) activities (e.g., sleep, fitness activities, or other activities), or (iv) other items. The objects may have attributes, functions, or other aspects associated therewith. The object attributes may have associated values related to services, physiology parameters, activities, etc. (e.g., values representing the service-related information, the health-related information, or other information). The object functions may include calls to internal and external services (e.g., analytics subsystem 124 or other subsystems of servers 102, cloud services of external resources 140, etc.). Such object functions may be invoked to initiate such calls responsive to one or more triggers, such as when an object is created, when invoked by a user (e.g., clicking or dragging the object), automatically on a periodic basis or in accordance with a schedule, or other triggers. In one use case, a container object may initiate a call to analytics subsystem 124 to perform one or more predictions or calculations to determine information for the object. In another use case, an object may initiate a call to cloud services for deriving and validating episodes of care and/or executing other health-related analytics and statistic models (e.g., to determine information for the object or to perform other tasks).

As another example, the objects may be provided in the virtual space such that the objects are presented in the virtual space in accordance with the respective times of performance of the associated items (e.g., dates, points in time during respective days, etc., at which one or more services were or are to be performed, one or more measurements were or are to be taken, one or more activities occurred or predicted to occur, etc.). Additionally, or alternatively, the objects may be provided in the virtual space such that at least one dimension of each of the objects corresponds to quantity (e.g., quantities related to one or more services, quantities related to physiology of one or more individuals, quantities related to activity of one or more entities, or other quantities).

As an example, the service-related information may include (i) information indicating one or more services performed or to be performed (e.g., real-world services performed on behalf of the individual, group, or other entity), (ii) information indicating one or more times of performance of the services (e.g., dates, points in time during respective days, etc., at which the services were or are to be performed), (iii) information indicating one or more quantities related to the services, or (iv) other information (e.g., identifiers of the service providers, locations at which the services were performed, etc.). The indicated quantities may include (i) one or more expenses that the individual, group, or other entity is to incur from the services (e.g., out-of-pocket expenses or other expenses), (ii) one or more insurance benefits related to the services (e.g., discounts applied to the services, amounts covered or paid for by insurance, etc.), (iii) one or more amounts currently owed by the individual, group, or other entity (e.g., for respective ones of the services), (iv) one or more deductibles (e.g., deductibles paid, remaining deductibles, etc., for the individual or a group with which the individual is associated), or (v) other quantities.

As an example, the health-related information may include (i) physiology information associated with one or more individuals, (ii) activity information associated with one or more individuals (e.g., sleep information, fitness information, etc.), or (iii) or other information. The physiology information may include (i) information indicating one or more measurements of blood pressure, heart rate, weight, body mass index, fat mass, or other parameters, (ii) information indicating one or more times at which the measurements were taken or are to be taken, or (iii) other information. The activity information may include (i) information indicating one or more measurements of sleep, (ii) information indicating one or more measurements of fitness activities (e.g., steps taken, floors climbed, distance traveled, calories consumed, etc.), (iii) information indicating times of the activities (e.g., dates, points in time during respective days, etc., one or more measurements were or are to be taken, one or more activities occurred or predicted to occur, etc.), or (iv) other information.

In one use case, with respect to FIGS. 2C-2F, three-dimensional objects associated with services, physiology parameters, activities, or other items may be presented in virtual space 202. As shown in FIGS. 2C-2F, virtual space 202 includes objects associated with annual medical exams, objects associated with diabetes-related services, objects associated with root canal services, objects associated with weight, body mass index, and fat mass percentage, objects associated with sleep, objects associated with fitness activities, and objects associated with other items. In another use case, regions shown in FIG. 2C and regions shown in FIG. 2D may be presented in the same virtual space 202 at one or more given times. As an example, objects representing a user's current and previous health statuses (e.g., weight, body mass index, fat mass percentage, sleep amounts, etc.) may be presented in a region next to a region that includes objects representing related services performed for the user. Objects representing diabetes treatments may, for instance, be presented proximate objects representing the user's blood sugar level readings (e.g., current or past readings). As another example, objects representing the user's health statuses may be presented in a region next to a region that includes objects representing the user's related activities (e.g., fitness activities, sleep activities, etc.). In this way, for example, such presentation of the objects in virtual space 202 may indicate to the user the causal relationships between the services performed, the user's activities, and their outcomes (e.g., the user's current and previous health statuses). As such, the user may see the effect of the services or activities and, as a result, may be more incentivized or engaged to manage his/her health.

In some embodiments, with respect to FIGS. 2C-2F, at least some of the information represented by objects may be streamed or obtained in real-time from cloud services, IOT devices/systems (e.g., wearables or other sensor/monitoring devices), or other sources. As an example, with respect to FIG. 2C, a user's blood pressure, heart rate, weight, blood mass index, fat mass percentage, sleep amounts, fitness activities, or other information may be obtained in real-time from the user's wearables or their related cloud services, and the corresponding objects in virtual space 202 may be automatically updated to reflect the latest obtained information (e.g., their current statuses, averages or other information calculated from the latest obtained information and historical information, etc.). As another example, service information related to the user may be obtained from one or more cloud services, and the corresponding objects in virtual space 202 may be automatically updated to reflect the latest obtained information.

In some embodiments, interaction subsystem 118 may obtain user input indicating a movement of at least some objects to a first region of a virtual space (e.g., from one or more other regions of the virtual space or other source). The user input may include dragging of the objects onto the first region, tapping or clicking on the objects and the first region (e.g., simultaneously, sequentially, separately, etc.), or other user input to indicate the movement of the objects to the first region. Based on the user input, annotation subsystem 120 may associate the objects (to be moved) with the first region in a database storing information related to the virtual space and/or regions of the virtual space (e.g., virtual space database 134 or other database). In one use case, with respect to FIG. 2D, a user may drag a set of objects in the "Uncategorized" region of virtual space 202 onto an unlabeled region of virtual space 202 (which is subsequently labeled "Diabetes" as shown in FIG. 2F) between the "Root Canal" region and the "Annual Exam" region. In response, annotation subsystem 120 may automatically associate the region (which was unlabeled) with the dragged objects in a database.

In some embodiments, annotation subsystem 120 may determine a common category for a set of objects such that the common category is one which all the objects in the set (or at least a threshold number of the objects) are related. As an example, responsive to user input indicating a movement of at least some objects to a first region, annotation subsystem 120 may determine a common category to which all the objects (or at least a threshold number of the objects) are related, and associate the first region with the common category (e.g., as a result of the objects being moved to the first region). In some embodiments, virtual space subsystem 112 may provide a label representing the common category to be presented proximate the first region in the virtual space based on the movement of the objects to the first region (e.g., as a result of the first region being associated with the common category responsive to the object movement). As an example, the label representing the common category may be presented in the first region, adjacent the first region, or within a proximity threshold of the first region (e.g., a default threshold, a user-defined threshold, etc.).

As an example, prior to the label representing the common category being presented, there may be no category label or a different category label presented for the first region. Responsive to detecting the movement of the objects to the first region, the first region may be assigned the common category. Responsive to the assignment, the label representing the common category may be generated and presented proximate the first region. If, for example, another category label had been presented in the first region prior to the assignment, the label representing the common category may be presented (proximate the first region) in lieu of the other prior category label.

Figure 2D:
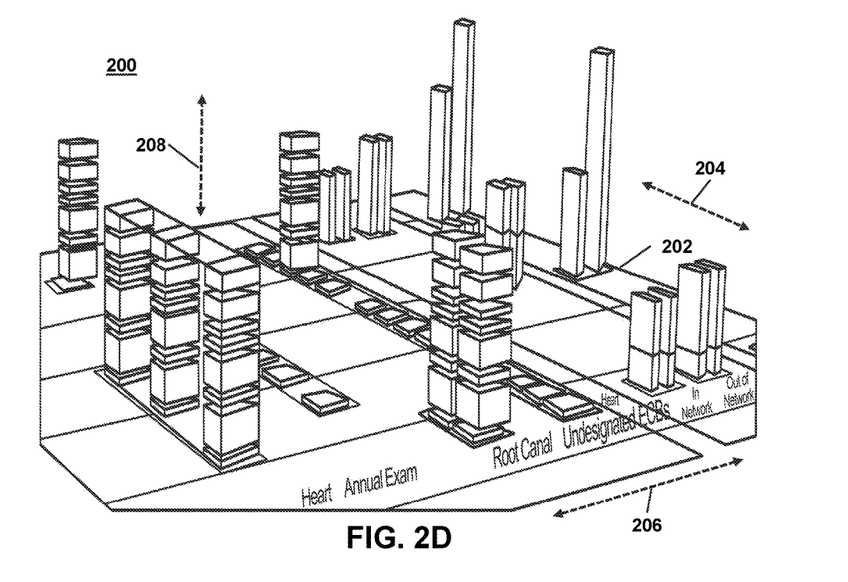
Figure 2E:
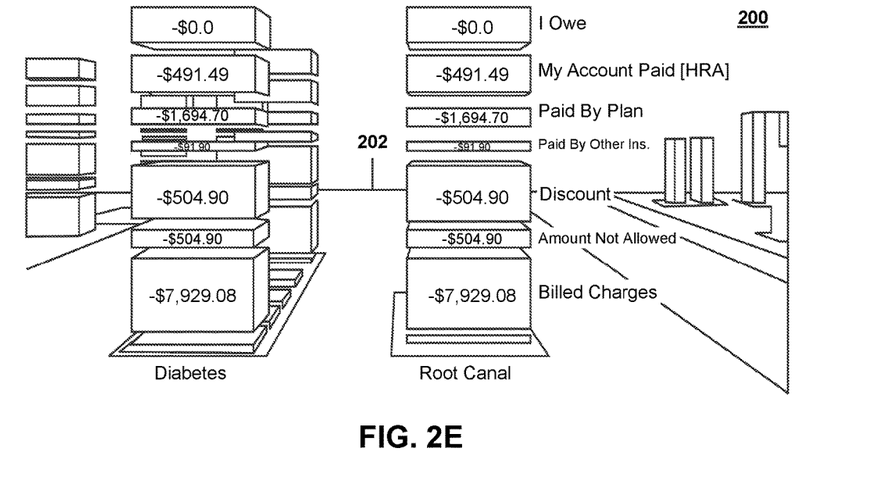
Figure 2F:
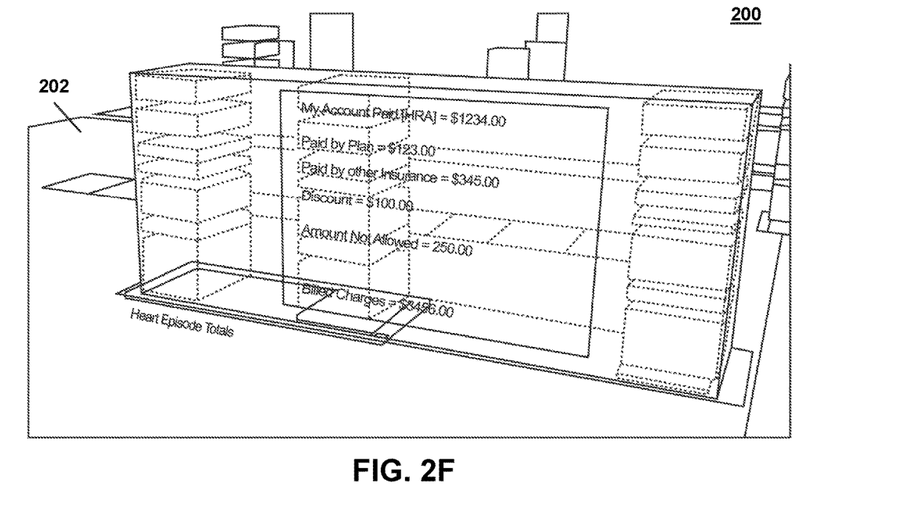

In one use case, with respect to FIGS. 2D and 2E, virtual space 202 at time t1 (e.g., shown in FIG. 2D) may have an unlabeled region between the "Root Canal" region and the "Annual Exam" region. When a user drags a set of objects (e.g., simultaneously, sequentially, separately, etc.) onto the region (unlabeled at time t1), category attributes or other information related to the objects may be automatically obtained and processed to determine a common category among the objects. For example, if a comparison indicates that all the objects have the attribute value "Diabetes," the "Diabetes" category may be determined for the objects. In response to the dragging and the determination of the common category, annotation subsystem 120 and virtual space subsystem 112 may automatically assign the common category to the region (onto which the objects were dragged) and presented the region with the label "Diabetes" in virtual space 202 (e.g., as shown in FIG. 2E).

In some embodiments, a user may manually add or modify a label for a region (e.g., manually override automatically-suggested labels, manually add labels, etc.). As an example, interaction subsystem 118 may obtain a user input requesting that a label be added to an unlabeled region, where the user input may include a user-defined label. Annotation subsystem 120 or virtual space subsystem 112 may then assign the user-defined label to the region (which was previously unlabeled). As another example, if a region has a category label, interaction subsystem 118 may obtain a user input requesting that a user-defined label (e.g., another category or other label) be added to the region or used to replace the region's category label. Annotation subsystem 120 or virtual space subsystem 112 may then take the appropriate action by assigning the user-defined label to the region (e.g., as its updated category or as an additional label), removing the region's previously-assigned category label, etc.

In some embodiments, interaction subsystem 118 may obtain a first user input indicating a movement of a first object to a first region of a virtual space (e.g., from another region of the virtual space or other source). Based on the object movement, annotation subsystem 120 may associate the first region with a first category related to the first object, and virtual space subsystem 112 may provide a label representing the first category to be presented proximate the first region in the virtual space. As an example, the label representing the first category may be presented in the first region, adjacent the first region, or within a proximity threshold of the first region (e.g., a default threshold, a user-defined threshold, etc.).

In some embodiments, after the first object is moved to the first region, interaction subsystem 117 may obtain a second user input indicating a movement of a second object to the first region of the virtual space (e.g., from another region of the virtual space or other source). Based on the movement of the second object, annotation subsystem 112 may associate the first region with a second category with which both the first object and the second object are related, and virtual space subsystem 112 may provide a label representing the second category to be presented proximate the first region. As an example, the label representing the second category may be presented in the virtual space in lieu of the label representing the first category. As another example, the label representing the second category may be presented in the virtual space proximate the first region in the virtual space in addition to the label representing the first category such that both the labels are presented proximate the first region.

In one scenario, with respect to FIG. 2E, virtual space 202 at time t1 may have a "Diabetes Lab Tests" region between the "Root Canal" region and the "Annual Exam" region (e.g., virtual space 202 at time t1 may be prior in time to virtual space 202 as shown in FIG. 2E). When a user drags a set of objects that are not associated with lab test services, but are associated with pharmaceutical services for diabetes, onto the "Diabetes Lab Tests" region, category attributes or other information related to the dragged objects and the objects already in the "Diabetes Lab Tests" region may be automatically obtained and processed to determine a common category among the objects. For example, if a comparison indicates that all the objects (now in the "Diabetes Lab Tests" region) have the attribute value "Diabetes," the "Diabetes" category may be determined for the objects. Based on the dragging and the determination of the common category, the "Diabetes Lab Tests" region (onto which the objects were dragged) may be automatically assigned and presented with the label "Diabetes" (e.g., as shown in FIG. 2E). In a further scenario, the "Diabetes Label Tests" label may automatically be replaced by the common category label and/or prompt a user to confirm the replacement.

In some embodiment, based on the movement of the second object to the first region, annotation subsystem 120 may remove the association between the first region and the first category. As an example, if the label representing the second category is provided as a replacement for the label representing the first category in the virtual space, annotation subsystem 120 may remove the association between the first region and the first category from a database storing information regarding such associations (e.g., virtual space database 134 or other database) responsive to (i) the movement of the second object to the first region, (ii) the association between the first region and the second category, (iii) the replacement of the label representing the first category in the virtual space, or (iv) other trigger.

In some embodiments, interaction subsystem 118 may obtain user input indicating a movement of at least some objects to a first region of a virtual space (e.g., from one or more other regions of the virtual space or other source). Based on the movement of the objects, object subsystem 116 may provide a container object proximate the first region and the moved objects in the virtual space. As an example, the container object may be presented in the first region, adjacent the first region or the objects, within a proximity threshold of the first region or the objects (e.g., a default threshold, a user-defined threshold, etc.), or proximate the objects such that the container object contains the objects from a user perspective. In some embodiments, interaction subsystem 118 may allow a user to override automated actions or suggestions. As an example, a user may manually override the automatic creation of a container object, the automatic placement of objects within the container object, the automated suggestion/action to decline to create the container object or place objects within the container object, the automatic generation or suggestion of labels for the container object or other objects, the automatically-derived values for the container object or other objects, or other automated actions or suggestions. In one use case, for instance, a user may remove an automatically-created container object from the virtual space. A user may move objects placed within a container object outside of the container object. A user may override the automated suggestion/action to decline to create the container object or place objects within the container object by nevertheless creating the container object or placing the objects within the container object. A user may add labels to the container object or other objects as well as modify labels of the container object or other objects. A user may override automatically-derived values for the container objects or other objects by manually modifying those automatically-derived values to replace such values with user-provided values.

In some embodiments, analytics subsystem 124 may use values associated with the objects (that are moved to the first region) to determine one or more values for the container object. Upon determination of such values, annotation subsystem 120 may associate the determined values with the container object in a database storing such values for objects (e.g., virtual space database 134 or other database). In some embodiments, virtual space subsystem 112 may provide one or more labels representing the determined values associated with the container object to be presented proximate the container object in the virtual space based on (i) the movement of the objects to the first region, (ii) the association between the determined values and the container object, or (iv) other trigger. The container object may be presented in the virtual space such that a portion of the first object is within the container object from a user perspective, a portion of the second object is within the container object from the user perspective, or the first object and the second object are completely within the container object from the user perspective. In some embodiments, other number of objects may be moved to the first region (or another region), be partially or completely contained within a container object, or used for their respective values to calculate values for a container object.

As an example, such container objects may be versatile and intelligent containers. Such container objects may, for instance, be associated with object functions for calling internal and external services (e.g., analytics subsystem 124 or other subsystems of servers 102, cloud services of external resources 140, etc.). In one scenario, a container object may initiate a call to analytics subsystem 124 to perform one or more predictions or calculations to determine information for the container object (e.g., when the container object is created, when invoked by a user (e.g., clicking or dragging the container object, clicking or dragging an object within or proximate the container object, placing an object outside of the container object into the container object, etc.), automatically on a periodic basis or in accordance with a schedule, or responsive to other triggers). In another scenario, a container object may initiate a call to cloud services for deriving and validating episodes of care and/or executing other health-related analytics and statistic models (e.g., to determine information for the container object when the container object is created, when invoked by a user, automatically on a periodic basis or in accordance with a schedule, or responsive to other triggers).

In one use case, with respect to FIG. 2F, container object 222 is presented in virtual space 202 such that object sets 212, 214, and 216 are completely within container object 222 in the rendering of virtual space 202, object sets 212, 214, and 216, and container object 222. As indicated in FIG. 2F, the attribute values for container object 222 (e.g., $1234.00, $123.00, $345.00, $100.00, $250.00, $3456.00, etc.) may be calculated from the respective sums of attribute values of the objects of the object sets 212, 214, 216 (e.g., the attribute values for attributes "My Account Paid," "Paid by Plan," "Paid by Other Insurance," "Discount," "Amount Not Allowed," "Billed Charges," etc. of the objects). Such calculations may be automatically performed responsive to the objects being placed in the same region. In a further use case, the attributes values for container object 222 may be determined and presented in the same region as the objects based on the objects 212, 214, and 216 being in that region of virtual space 202 (e.g., automatically placed in the region without the user's explicit indication to place the objects in that region, placed in the region via dragging or other user techniques, etc.).

In some embodiments, analytics subsystem 124 may predict one or more outcomes related to an individual's health (or other aspect of the individual or others related to the individual) based on services performed or proposed to be performed for or on behalf of the individual, activities performed by the individual, or other information. In some embodiments, analytics subsystem 124 may perform such outcome predictions based on one or more prediction models (e.g., demographic-specific prediction models, disease-specific prediction models, or other prediction models). In some embodiments, health-related information, service-related information, or other information associated with other individuals may be used to generate such prediction models. As an example, information associated with other individual having one or more similar characteristics as the individual may be used to generate a prediction model for use in predicting outcomes for the individual. In one use case, a prediction model generated from information associated with other individuals (with similar demographic characteristics as the individual) may be used to predict outcomes for the individual. Additionally, or alternatively, the prediction model may be generated from information associated with other individuals with similar disease characteristics as the individual's disease. In some embodiments, the prediction model may be a neural network or other prediction model. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neutral unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, object subsystem 116 may provide one or more objects in a virtual space based on the predicted outcomes. As an example, the objects may represent the predicted outcomes in the virtual space, which shows the individual (or other user) specific potential outcomes that may result from one or more services or activities being performed. In one use case, objects representing the predicted outcomes (e.g., weight, body mass index, fat mass percentage, sleep amounts, etc.) may be presented proximate the objects representing the related services or activities. In another use case, objects representing diabetes treatments may, for instance, be presented proximate objects representing one or more predicted user's blood sugar levels (e.g., future blood sugar level readings). In this way, for example, such presentation of the predicted outcomes in virtual space 202 may indicate to the user the causal relationships between the services performed, the user's activities, and the potential outcomes (e.g., the user's future health statuses). As such, the user may see the potential effect of the services or activities (e.g., the specific potential effects) and, as a result, may be more incentivized or engaged to manage his/her health.

Examples Flowcharts

Figure 3:
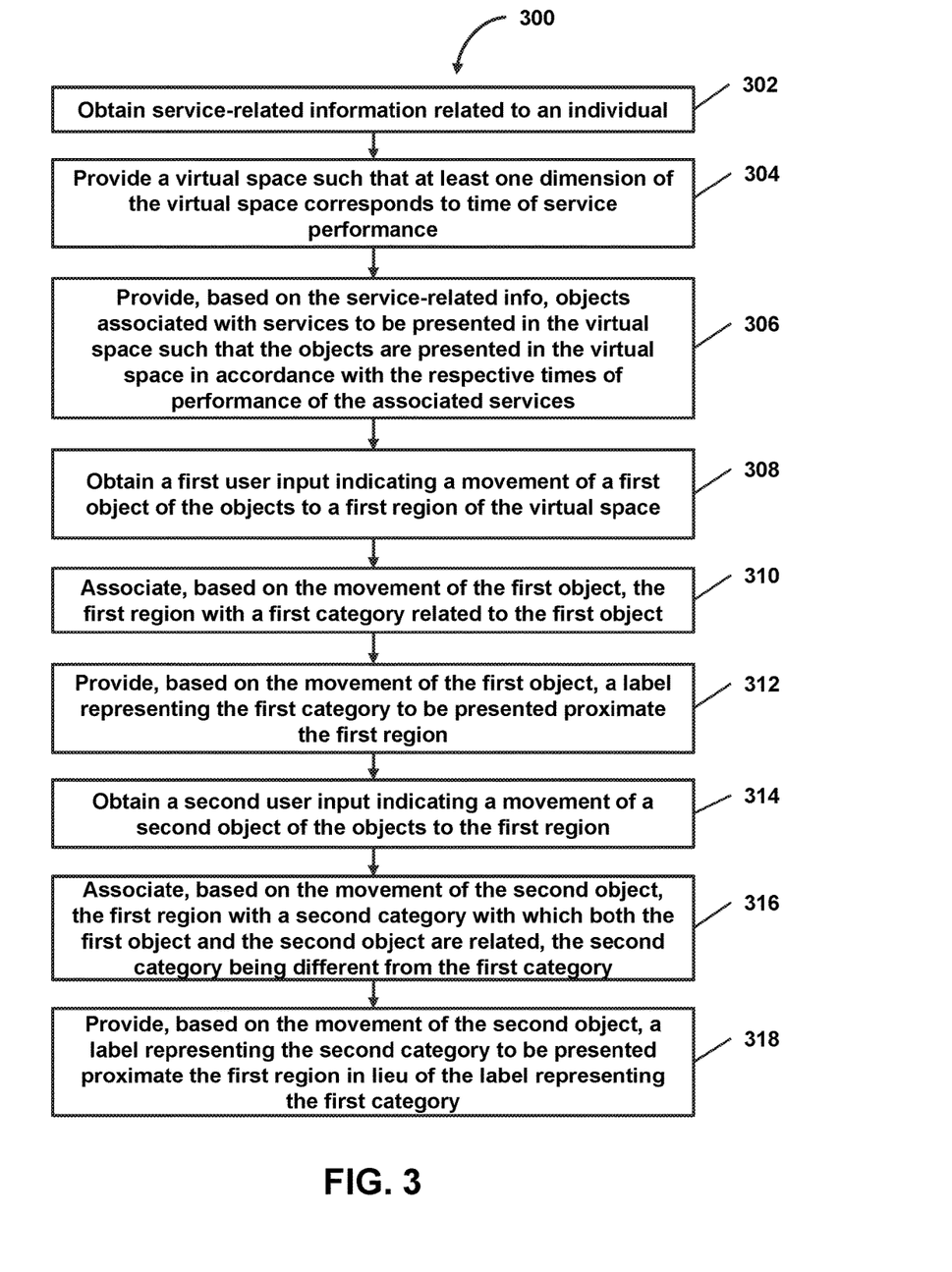
FIG. 3 shows a flowchart of a method of presenting dimension-based representation of service-related information and facilitating user interaction therewith in a virtual space, in accordance with one or more embodiments.
Figure 4:
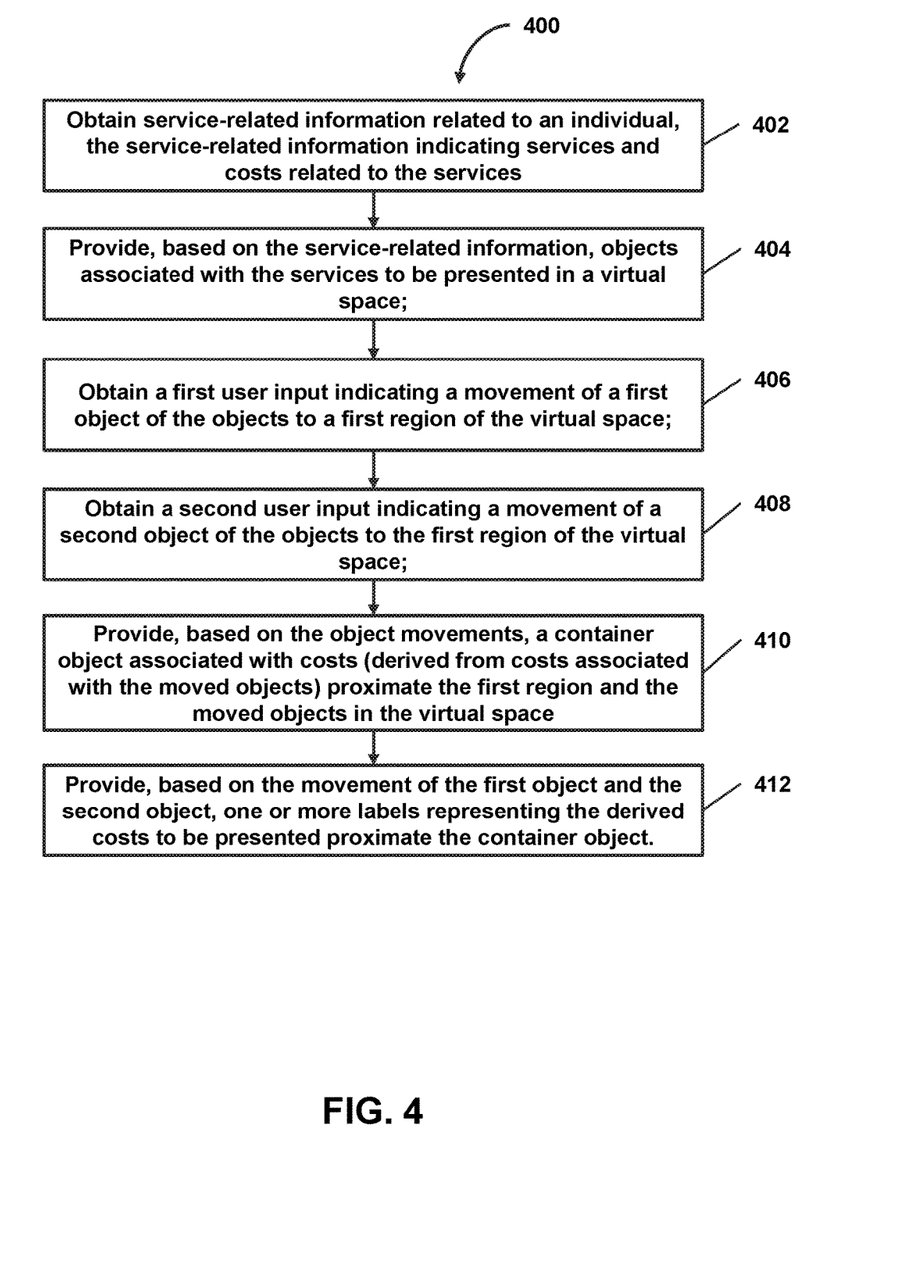
FIG. 4 shows a flowchart of a method of facilitating user interaction with representations of service-related information in a virtual space, in accordance with one or more embodiments.

FIGS. 3 and 4 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of presenting dimension-based representation of service-related information and facilitating user interaction therewith in a virtual space, in accordance with one or more embodiments.

In an operation 302, service-related information related to an individual may be obtained. As an example, the service-related information may include (i) information indicating one or more services performed or to be performed (e.g., real-world services performed on behalf of the individual), (ii) information indicating one or more times of performance of the services, (iii) information indicating one or more quantities related to the services, or other information. The indicated quantities may include (i) one or more expenses that the individual is to incur from the services (e.g., out-of-pocket expenses or other expenses), (ii) one or more insurance benefits related to the services (e.g., discounts applied to the services, amounts covered or paid for by insurance, etc.), (iii) one or more amounts currently owed by the individual (e.g., for respective ones of the services), (iv) one or more deductibles (e.g., deductibles paid, remaining deductibles, etc., for the individual or a group with which the individual is associated), or (v) other quantities. Operation 302 may be performed by a profile subsystem that is the same as or similar to profile subsystem 114, in accordance with one or more embodiments.

In an operation 304, a virtual space may be provided. As an example, the virtual space may include a two-dimensional virtual space, a three-dimensional virtual space, or other virtual space. As another example, the virtual space may be provided such that at least one dimension of the virtual space corresponds to time of service performance. Additionally, or alternatively, the virtual space may be provided such that at least one dimension of the virtual space corresponds to quantity. Operation 304 may be performed by a virtual space subsystem that is the same as or similar to virtual space subsystem 112, in accordance with one or more embodiments.

In an operation 306, objects associated with the services may be provided based on the service-related information to be presented in the virtual space. As an example, the objects may be provided in the virtual space such that the objects are presented in the virtual space in accordance with the respective times of performance of the associated services. Additionally, or alternatively, the objects may be provided in the virtual space such that at least one dimension of each of the objects corresponds to a monetary amount (or other quantity) related to at least one of the services. As another example, the objects may include two-dimensional objects, three-dimensional objects, or other objects associated with the services. Operation 306 may be performed by an object subsystem that is the same as or similar to object subsystem 116, in accordance with one or more embodiments.

In an operation 308, a first user input may be obtained, where the first user input indicates a movement of a first object of the objects to a first region of the virtual space. The first user input may include dragging of the first object onto the first region (e.g., from another region of the virtual space or other source), tapping or clicking on the first object and the first region (e.g., simultaneously, sequentially, etc.), or other user input to indicate the movement of the first object to the first region. Operation 308 may be performed by an interaction subsystem that is the same as or similar to interaction subsystem 118, in accordance with one or more embodiments.

In an operation 310, the first region may be associated with a first category (related to the first object) based on the movement of the first object. As an example, responsive to detecting the movement of the first object to the first region, the first region may be assigned the first category (e.g., as an attribute value of the first region) in a database storing information related to the virtual space and/or regions of the virtual space. Operation 310 may be performed by an annotation subsystem that is the same as or similar to annotation subsystem 120, in accordance with one or more embodiments.

In an operation 312, a label representing the first category may be provided to be presented proximate the first region in the virtual space based on the movement of the first object. As an example, the label representing the first category may be presented in the first region, adjacent the first region, or within a proximity threshold of the first region. As an example, prior to the label representing the first category being presented, there may be no category label or a different category label presented for the first region. Responsive to detecting the movement of the first object to the first region, the first region may be assigned the first category. Responsive to the assignment, the label representing the first category may be generated and presented proximate the first region. If, for example, another category label had been presented in the first region prior to the assignment, the label representing the first category may be presented (proximate the first region) in lieu of the other prior category label. As such, the label representing the first category may replace the other prior category label for the first region. Operation 312 may be performed by a virtual space subsystem that is the same as or similar to virtual space subsystem 112, in accordance with one or more embodiments.

In an operation 314, a second user input may be obtained, where the second user input indicates a movement of a second object of the objects to the first region of the virtual space. The second user input may include dragging of the second object onto the first region (e.g., from another region of the virtual space or other source), tapping or clicking on the second object and the first region (e.g., simultaneously, sequentially, etc.), or other user input to indicate the movement of the second object to the first region. Operation 314 may be performed by an interaction subsystem that is the same as or similar to interaction subsystem 118, in accordance with one or more embodiments.

In an operation 316, the first region may be associated with a second category (with which both the first object and the second object are related) based on the movement of the second object. As an example, responsive to detecting the movement of the second object to the first region, the first region may be assigned the second category (e.g., as an attribute value of the first region) in a database storing information related to the virtual space and/or regions of the virtual space. Operation 316 may be performed by an annotation subsystem that is the same as or similar to annotation subsystem 120, in accordance with one or more embodiments.

In an operation 318, a label representing the second category may be provided to be presented proximate the first region in the virtual space (in lieu of the label representing the first category) based on the movement of the second object. As an example, the label representing the second category may be presented in the first region, adjacent the first region, or within a proximity threshold of the first region. As an example, responsive to detecting the movement of the second object to the first region and determining that the second category is different from the first category, the first region may be assigned the second category. Responsive to the assignment, the label representing the second category may be generated and presented (proximate the first region) in lieu of the label representing the first category. As such, the label representing the second category may replace the label representing the first category for the first region. Operation 318 may be performed by a virtual space subsystem that is the same as or similar to virtual space subsystem 112, in accordance with one or more embodiments.

FIG. 4 shows a flowchart of a method 400 of facilitating user interaction with representations of service-related information in a virtual space, in accordance with one or more embodiments.

In an operation 402, service-related information related to an individual may be obtained. As an example, the service-related information may include information indicating services (e.g., real-world services performed or to be performed on behalf of the individual) and (ii) information indicating one or more costs related to the real-world services (e.g., out-of-pocket expenses, discounts applied to the services, amounts covered or paid for by insurance, amounts currently owned by the individual for respective ones of the services, deductibles paid with respect to the services, etc.). Operation 402 may be performed by a profile subsystem that is the same as or similar to profile subsystem 114, in accordance with one or more embodiments.

In an operation 404, objects associated with the services may be provided to be presented in a virtual space based on the service-related information. As an example, the objects may include one or more two-dimensional objects, three-dimensional objects, or other objects. The virtual space may include a two-dimensional virtual space, a three-dimensional virtual space, or other virtual space. As another example, at least one dimension of the virtual space may correspond to time of service performance. Additionally, or alternatively, at least one dimension of the virtual space may correspond to quantity. As another example, the objects may be provided in the virtual space such that the objects are presented in the virtual space in accordance with the respective times of performance of the associated services. Additionally, or alternatively, the objects may be provided in the virtual space such that at least one dimension of each of the objects corresponds to a monetary amount (or other quantity) related to at least one of the services. Operation 404 may be performed by an object subsystem that is the same as or similar to object subsystem 116, in accordance with one or more embodiments.

In an operation 406, a first user input may be obtained, where the first user input indicates a movement of a first object of the objects to a first region of the virtual space. The first user input may include dragging of the first object onto the first region (e.g., from another region of the virtual space or other source), tapping or clicking on the first object and the first region (e.g., simultaneously, sequentially, etc.), or other user input to indicate that the first object and the first region be associated with one another. Operation 406 may be performed by an interaction subsystem that is the same as or similar to interaction subsystem 118, in accordance with one or more embodiments.

In an operation 408, a second user input may be obtained, where the second user input indicates a movement of a second object of the objects to the first region of the virtual space. The second user input may include dragging of the second object onto the first region (e.g., from another region of the virtual space or other source), tapping or clicking on the second object and the first region (e.g., simultaneously, sequentially, etc.), or other user input to indicate that the second object and the first region be associated with one another. Operation 408 may be performed by an interaction subsystem that is the same as or similar to interaction subsystem 118, in accordance with one or more embodiments.

In an operation 410, a container object may be provided proximate the first region, the first object, and the second object in the virtual space based on the movement of the first object and the second object. As an example, the container object may be associated with one or more costs derived from one or more costs associated with the first object and one or more costs associated with the second object. In one use case, the costs associated with the container object may be determined from the costs associated with the first object and the costs associated with the second object responsive to the movement of the objects to the first region. The container object may be generated and associated with the determined costs, and the container object and its determined associated costs may be presented in the virtual space in the first region and proximate the first object and the second object. In another use case, the container object may be presented in the virtual space such that a portion of the first object is within the container object from a user perspective, a portion of the second object is within the container object from the user perspective, or the first object and the second object are completely within the container object from the user perspective. Operation 410 may be performed by an object subsystem that is the same as or similar to object subsystem 116, in accordance with one or more embodiments.

In an operation 412, one or more labels representing the derived costs may be provided to be presented proximate the container object based on the movement of the first object and the second object. Operation 412 may be performed by a virtual space subsystem that is the same as or similar to virtual space subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., service/benefits database(s) 132, virtual space database(s) 134, or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-124 described herein is for illustrative purposes, and is not intended to be limiting, as any of subsystems 112-124 may provide more or less functionality than is described. For example, one or more of subsystems 112-124 may be eliminated, and some or all of its functionality may be provided by other ones of subsystems 112-124. As another example, additional subsystems may be programmed to perform some or all of the functionality attributed herein to one of subsystems 112-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system for presenting dimension-based representation of service-related information in a three-dimensional virtual space, comprising:
    a computer system comprising one or more processors programmed with computer program instructions that, when executed, cause the computer system to:
        obtain service-related information related to an individual, the service-related information comprising (i) information indicating one or more real-world services performed or to be performed, (ii) information indicating one or more times of performance of the real-world services, (iii) information indicating one or more quantities related to the real-world services, the quantities comprising one or more expenses that the individual is to incur for the real-world services or one or more insurance benefits related to the real-world services;
        provide a three-dimensional virtual space such that at least one dimension of the three-dimensional virtual space corresponds to time of service performance;
        provide, based on the service-related information, one or more three-dimensional objects associated with the real-world services to be presented in the three-dimensional virtual space such that (i) at least one dimension of each of the three-dimensional objects corresponds to a monetary amount related to at least one of the real-world services and (ii) the three-dimensional objects are presented in the three-dimensional virtual space in accordance with the respective times of performance of the associated services, wherein each of the three-dimensional objects is related to one or more categories;
        obtain a first user input indicating a movement of a first object of the three-dimensional objects to a first region of the three-dimensional virtual space;
        associate, based on the movement of the first object, the first region with a first category related to the first object; and
        provide, based on the movement of the first object, a label representing the first category to be presented proximate the first region.

2. The system of claim 1, wherein the first user input corresponds to a dragging of the first object onto the first region, wherein associating the first region comprises associating, based on the dragging, the first region with the first category, and wherein providing the label representing the first category comprises providing, based on the dragging, the label representing the first category to be presented proximate the first region.

3. The system of claim 1, wherein the computer system is further caused to:
    obtain a second user input indicating a movement of a second object of the three-dimensional objects to the first region of the three-dimensional virtual space;
    associate, based on the movement of the second object, the first region with a second category with which both the first object and the second object are related, the second category being different from the first category; and
    provide, based on the movement of the second object, a label representing the second category to be presented proximate the first region in lieu of the label representing the first category.

4. The system of claim 3, wherein the computer system is further caused to remove, based on the movement of the second object, the association of the first region with the first category.

5. The system of claim 1, wherein the computer system is further caused to:
    obtain user input indicating a movement of at least some objects of the three-dimensional objects to a given region of the three-dimensional virtual space;
    determine a common category to which all the at least some objects are related;
    associate, based on the movement of the at least some objects, the given region with the common category; and
    provide, based on the movement of the at least some objects, a label representing the common category to be presented proximate the given region.

6. The system of claim 1, wherein the computer system is further caused to:
    obtain user input indicating a movement of at least some objects of the three-dimensional objects to a given region of the three-dimensional virtual space;
    provide, based on the movement of the at least some objects, a container object proximate the given region and the at least some objects in the three-dimensional virtual space, the container object being associated with one or more values derived from values associated with the at least some objects; and
    provide, based on the movement of the at least some objects, one or more labels representing the derived values to be presented proximate the container object.

7. The system of claim 6, wherein providing the container object comprises providing, based on the movement of the at least some objects, the container object to be presented in the three-dimensional virtual space such that the at least some objects are within the container object from a user perspective.

8. The system of claim 7, wherein at least a portion of one of the at least some objects and at least a portion of another one of the at least some objects are within the container object from the user perspective.

9. The system of claim 7, wherein the at least some objects are completely within the container object from the user perspective.

10. The system of claim 1, wherein the quantities related to the real-world services comprises one or more measures of predicted outcomes of the real-world services, the predicted outcomes being generated based on tracked data over a period of time from user input or automatically from measuring devices, and wherein the computer system is further caused to:
provide, based on the service-related information, one or more other three-dimensional objects associated with the real-world services to be presented in the three-dimensional virtual space such that at least one dimension of each of the other three-dimensional objects corresponds to a measure of a predicted outcome of at least one of the real-world services.

11. The system of claim 1, wherein the quantities related to the real-world services comprises one or more measures of user activities related to the real-world services, the one or more measures comprising tracked data over a period of time from user input or automatically from measuring devices, and wherein the computer system is further caused to:
provide, based on the service-related information, one or more other three-dimensional objects associated with the real-world services to be presented in the three-dimensional virtual space such that at least one dimension of each of the other three-dimensional objects corresponds to a measure of a user activity related to at least one of the real-world services.

12. A method of presenting dimension-based representation of service-related information in a three-dimensional virtual space, the method being implemented by one or more processors executing computer program instructions that, when executed, perform the method, the method comprising:
obtaining service-related information related to an individual, the service-related information comprising (i) information indicating one or more real-world services performed or to be performed, (ii) information indicating one or more times of performance of the real-world services, (iii) information indicating one or more quantities related to the real-world services, the quantities comprising one or more expenses that the individual is to incur for the real-world services or one or more insurance benefits related to the real-world services;
providing a three-dimensional virtual space such that at least one dimension of the three-dimensional virtual space corresponds to time of service performance;
providing, based on the service-related information, one or more three-dimensional objects associated with the real-world services to be presented in the three-dimensional virtual space such that (i) at least one dimension of each of the three-dimensional objects corresponds to a monetary amount related to at least one of the real-world services and (ii) the three-dimensional objects are presented in the three-dimensional virtual space in accordance with the respective times of performance of the associated services;
obtaining user input indicating a movement of at least some objects of the three-dimensional objects to a region of the three-dimensional virtual space;
providing, based on the movement of the at least some objects, a container object to be presented in the three-dimensional virtual space such that the at least some objects are within the container object from a user perspective, the container object being associated with one or more values derived from values associated with the at least some objects; and
providing, based on the movement of the at least some objects, one or more labels representing the derived values to be presented proximate the container object.

13. The method of claim 12, wherein the quantities related to the real-world services comprises one or more measures of predicted outcomes of the real-world services, the predicted outcomes being generated based on tracked data over a period of time from user input or automatically from measuring devices, the method further comprising:
providing, based on the service-related information, one or more other three-dimensional objects associated with the real-world services to be presented in the three-dimensional virtual space such that at least one dimension of each of the other three-dimensional objects corresponds to a measure of a predicted outcome of at least one of the real-world services.

14. The method of claim 12, wherein the quantities related to the real-world services comprises one or more measures of user activities related to the real-world services, the one or more measures comprising tracked data over a period of time from user input or automatically from measuring devices, the method further comprising:
providing, based on the service-related information, one or more other three-dimensional objects associated with the real-world services to be presented in the three-dimensional virtual space such that at least one dimension of each of the other three-dimensional objects corresponds to a measure of a user activity related to at least one of the real-world services.

15. A system for facilitating user interaction with representations of service-related information in a three-dimensional virtual space, comprising:
a computer system comprising one or more processors programmed with computer program instructions that, when executed, cause the computer system to:
obtain service-related information related to an individual, the service-related information comprising (i) information indicating one or more real-world services performed or to be performed and (ii) information indicating one or more quantities related to the real-world services;
provide, based on the service-related information, three-dimensional objects associated with the real-world services to be presented in a three-dimensional virtual space;
obtain a first user input indicating a movement of a first object of the three-dimensional objects to a first region of the three-dimensional virtual space;
obtain a second user input indicating a movement of a second object of the three-dimensional objects to the first region of the three-dimensional virtual space;
provide, based on the movement of the first object and the second object, a container object proximate the first region, the first object, and the second object in the three-dimensional virtual space, the container object being associated with one or more quantities derived from one or more quantities associated with the first object and one or more quantities associated with the second object; and provide, based on the movement of the first object and the second object, one or more labels representing the derived quantities to be presented proximate the container object.

16. The system of claim 15, wherein providing the container object comprises providing, based on the movement of the first object and the second object, the container object to be presented in the three-dimensional virtual space such that the first object and the second object are within the container object from a user perspective.

17. The system of claim 16, wherein at least a portion of the first object and at least a portion of the second object are within the container object from the user perspective.

18. The system of claim 16, wherein the first object and the second object are completely within the container object from the user perspective.

19. The system of claim 15, wherein each of the three-dimensional objects is related to one or more categories, and wherein the computer system is further caused to:

associate, based on the movement of the first object, the first region with a first category related to the first object; and provide, based on the movement of the first object, a label representing the first category to be presented proximate the first region.

20. The system of claim 19, wherein the first user input corresponds to a dragging of the first object onto the first region, wherein associating the first region comprises associating, based on the dragging, the first region with the first category, and wherein providing the label representing the first category comprises providing, based on the dragging, the label representing the first category to be presented proximate the first region.

21. The system of claim 19, wherein the computer system is further caused to:

associate, based on the movement of the second object, the first region with a second category with which both the first object and the second object are related, the second category being different from the first category; and provide, based on the movement of the second object, a label representing the second category to be presented proximate the first region in lieu of the label representing the first category.

22. The system of claim 15, wherein the computer system is further caused to:

determine a common category to which both the first object and the second object are related;

associate, based on the movement of the first object and the second object, the first region with the common category; and provide, based on the movement of the first object and the second object, a label representing the common category to be presented proximate the first region.

* * * * *